US006757033B2

(12) United States Patent
Song et al.

(10) Patent No.: US 6,757,033 B2
(45) Date of Patent: Jun. 29, 2004

(54) LIQUID CRYSTAL DISPLAY DEVICE AND METHOD FOR MANUFACTURING THE SAME

(75) Inventors: In Duk Song, Kyongsangbuk-do (KR); Young Woo Cho, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/316,107

(22) Filed: Dec. 11, 2002

(65) Prior Publication Data

US 2003/0122984 A1 Jul. 3, 2003

(30) Foreign Application Priority Data

Dec. 28, 2001 (KR) ..................................... P2001-86764

(51) Int. Cl.[7] ............................................... G02F 1/13
(52) U.S. Cl. ....................................................... 349/48
(58) Field of Search ........................................... 349/48

(56) References Cited

U.S. PATENT DOCUMENTS 6,340,998 B1 * 1/2002 Kim et al. .................... 349/48
6,404,466 B1 * 6/2002 Miyahara ..................... 349/48

* cited by examiner

Primary Examiner—James A. Dudek
(74) Attorney, Agent, or Firm—Morgan, Lewis & Bockius LLP

(57) ABSTRACT

A liquid crystal display device includes a substrate, first and second gate lines on the substrate, wherein each gate line has at least one gate electrode, a gate insulating layer above the gate lines, at least one data line crossing over the gate lines, a first semiconductor layer above a gate electrode of the first gate line, a source electrode connected to the data line and overlapping a first side of the first semiconductor layer, a drain electrode overlapping a second side of the first semiconductor layer, a second semiconductor layer adjacent to and above the second gate line, an upper electrode covering the second semiconductor layer and at least partially overlapping the second gate line, a passivation layer above the drain electrode and the upper electrode, contact holes in the passivation layer above the drain electrode and the second semiconductor layer and a pixel electrode on the passivation layer that is connected to the drain electrode and the upper electrode through the contact holes.

15 Claims, 3 Drawing Sheets

LIQUID CRYSTAL DISPLAY DEVICE AND METHOD FOR MANUFACTURING THE SAME

This application claims the benefit of the Korean Application No. P2001-86764 filed in Korea on Dec. 28, 2001, which is hereby incorporated by reference in its entirety.

BACKGROUND OF THE INVENTION

1. Field of the Invention

The present invention relates to a liquid crystal display device, and more particularly, to a liquid crystal display device and a method of manufacturing the same having a storage-on-gate system.

2. Discussion of the Related Art

As an information society develops, so does the demand for various types of displays. Recently, efforts have been made to research and develop various types of flat display panels, such as Liquid Crystal Display (LCD), Plasma Display Panel (PDP), Electroluminescent Display (ELD), Vacuum Fluorescent Display (VFD), and the like. An LCD is widely used as a substitution for a Cathode Ray Tube (CRT) because of the characteristics or advantages of a high quality image, light weight, shallow depth, compact size, and low power consumption. An LCD is applicable to devices that receive display signals, such as a television, computer monitor, and the like. Various technical developments for different types of LCD have been made such that LCDs play a role as an image display in various fields. However, in order for an LCD to be used as a general display device for a variety of various fields, the LCD needs to realize a high quality image with high resolution, a high brightness, a wide screen and the like, as well as, maintain the characteristics of light weight, shallow depth, compact size, and low power consumption In general, a liquid crystal display includes two substrates in which electrodes on one substrate confront an electrode on the other substrate. A liquid crystal is injected between the confronting electrodes of the substrates. If a voltage is applied across the confronting electrodes, which generate an electric field, liquid crystals molecules are driven in accordance with the electric field and thus light transmittance through the substrates is varied. There are various types of liquid crystal displays. In particular, an Active Matrix Liquid Crystal Display (AM-LCD) contains thin film transistors that are respectively connected to pixel electrodes. The pixel electrodes, which are on one substrate, are arranged in a matrix and confront a common electrode, which is on the other substrate. The pixel electrodes and common electrode drive liquid crystal molecules by applying an electric field between the substrates in a direction vertical to the substrates. The AM-LCD provides excellent resolution for displaying moving images.

A liquid crystal display according to the related art is explained by referring to the attached drawings of FIG. 1 and FIG. 2. As shown in FIG. 1, a plurality of gate lines 11 is formed in one direction on a lower array substrate 10 of a liquid crystal display. A gate 12 protrudes from one side of each of the gate lines 11. A plurality of data lines 14 is formed perpendicularly to the gate lines 11 that cross over the gate lines 11. Pixel areas are defined between pairs of data lines and gate lines adjacent to where they cross over each other. Source electrodes 15 protrude from one side of each of the data lines 14. A drain electrode 16 is separated from the source electrode 15 by a predetermined interval. The drain electrode connects to a pixel electrode 18 through a contact hole 17a. Moreover, the source electrode 15, drain electrode 16, and gate electrode 12 are parts of a thin film transistor T.

FIG. 2 is a cross-sectional view along line II–II' in FIG. 1 showing that the thin film transistor includes an active layer 13' of amorphous silicon over the gate electrode 12. A gate insulator 22 insulates amorphous silicon layer 13 from the gate electrode 12. The source electrode 15 and drain electrode 16 respectively overlap separate sides of the gate electrode 12. The amorphous silicon layer 13 includes a pair of ohmic contact layers 13" that respectively connect the source electrode 15 and drain electrode 16 to the active layer 13'.

An upper electrode 19a, as shown in FIG. 1, is formed for a storage capacitor Cst that maintains a pixel voltage on the pixel electrode 18. The upper electrode 19a of the storage capacitor Cst is formed of an opaque metal layer having a predetermined pattern. The lower electrode of the storage capacitor Cst is the gate line 11b for an adjacent cell, as shown in FIG. 1. The upper electrode 19a is formed to overlap the gate line 11b when the data line 14 and/or source electrode 15 is formed. The upper electrode 19a is insulated from the gate line 11b by the gate insulator 22. Hence, the gate line 11b, upper electrode 19a and gate insulating layer 22 construct the storage capacitor Cst of a storage-on-gate system.

A passivation layer 24 is formed to cover the source electrode 15, drain electrode 16, the first semiconductor layer 13 and the upper electrode 19a. The passivation layer 24 can be formed of silicon oxide, silicon nitride or other types of insulating materials. A pixel electrode 18 made of a transparent conductive material, such as indium-tin-oxide, is formed in each of the pixel areas on the passivation layer 24 such that it overlaps the upper electrode 19a and the drain electrode 16 in part. A contact hole 17a is formed in the passivation layer 24 at a portion where the pixel electrode 18 and drain electrode 16 overlap each other. In addition, another contact hole 17b is formed in the passivation 24 to expose a predetermined portion of the upper electrode 19a, as shown in FIG. 2. The pixel electrode 18 connects to the drain electrode 16 and upper electrode 19a through the contact holes 17a and 17b, respectively.

The cross-sectional view shown in FIG. 2 illustrates a storage-on gate part A and a thin film transistor part B of a cell for explaining the method of making the related art device. Referring to FIG. 2, a gate line 11b of an adjacent cell is formed on a lower array substrate 10 in the storage-on-gate part A. A gate line 11a of the cell is formed on the lower substrate 10 in the thin film transistor part B. A gate electrode 12 extending from the gate line 11a of the cell is formed in the thin film transistor part B. A gate insulating layer 22 is formed on the gate lines 11a and 11b and over entire surface of both the storage-on-gate part A and thin film transistor part B. A semiconductor layer 13 is formed in a thin film transistor forming area on the gate insulating layer 22 of the thin film transistor part B. The first semiconductor layer 13 includes, for example, an active layer 13' of amorphous silicon and a pair of ohmic contact layers 13" of doped amorphous silicon on the active layer 13'. The doped semiconductor layers or ohmic contact layers 13" are for ohmic contact and over-etch prevention. A source electrode 15 and a drain electrode 16 are formed to respectively overlap and connect to an ohmic contact layer 13". In this case, the source electrode 15 is an electrode extending from the data line 14. In addition, an upper electrode 19a that overlaps an adjacent gate line 11b is formed in the storage electrode part A simultaneously when the source and drain electrodes 15 and 16 are formed. A passivation layer 24 is formed over the upper electrode 19a, source electrodes 15, drain electrodes 16 and the semiconductor layer 13. Contact holes 17a and 17b exposing predetermined portions of the drain electrode 16 and opaque metal layer 19a respectively are formed in the passivation layer 24. A pixel electrode 18 made of a transparent material is formed on the passivation layer 24 and connected to the drain electrode 16 and upper electrode 19a through contact holes 17a and 17b, respectively.

However, the fabrication of the above-constituted liquid crystal display has the following problems or disadvantages. Typically, the metal used for the source electrode and drain electrode is Molybdenum (Mo). The Mo does not have etch selectivity to the etchant of the passivation layer that overlies the thin film transistor and the storage-on-gate system. The ohmic contact layers on the active layer in the thin film transistor have etch selectivity to the etchant used in the etching of the passivation layer. Therefore, the etchant cannot etch through the ohmic contact layer into the active layer if the etchant etches through the Mo of the source and drain electrodes. In the capacitor structure of a storage-on-gate system using Mo as the upper electrode, when the contact hole is formed in the passivation layer above the upper electrode, the Mo does not have etch selectivity to the etchant of the passivation layer. Hence, the upper electrode of the storage-on-gate system can be etched. If the Mo is over-etched, the gate insulating layer between the upper electrode metal layer and the gate electrode of an adjacent cell can be removed or breached. Thus, a subsequently deposited pixel electrode can be short-circuited to the gate line of an adjacent cell if the gate insulating layer is removed or breached by the etchant. Such a short-circuit will prevent an LCD from operating properly.

SUMMARY OF THE INVENTION

Accordingly, the present invention is directed to a liquid crystal display device and a method of manufacturing the same that substantially obviate one or more of the problems due to limitations and disadvantages of the related art.

An object of the present invention is to provide a liquid crystal display device and a method of manufacturing the same to provide a stable upper electrode connection structure.

Another object of the present invention is to provide a liquid crystal display device and a method of manufacturing the same that maintain the integrity of a storage capacitor in a storage-on-gate system in the liquid crystal display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a substrate, first and second gate lines on the substrate, wherein each gate line has at least one gate electrode, a gate insulating layer above the gate lines, at least one data line crossing over the gate lines, a first semiconductor layer above a gate electrode of the first gate line, a source electrode connected to the data line and overlapping a first side of the first semiconductor layer, a drain electrode overlapping a second side of the first semiconductor layer, a second semiconductor layer adjacent to and above the second gate line, an upper electrode covering the second semiconductor layer and at least partially overlapping the second gate line, a passivation layer above the drain electrode and the upper electrode, contact holes in the passivation layer above the drain electrode and the second semiconductor layer and a pixel electrode on the passivation layer that is connected to the drain electrode and the upper electrode through the contact holes.

In another aspect of the present invention, a method of manufacturing a liquid crystal display device on a substrate includes the steps of forming first and second gate lines on the substrate, wherein each gate line has at least one gate electrode, forming a gate insulating layer above the gate lines, forming at least one data line crossing over the first and second gate lines, forming a first semiconductor layer above a gate electrode of the first gate line, forming a source electrode connected to the data line and overlapping a first side of the first semiconductor layer, forming a drain electrode overlapping a second side of the first semiconductor layer, forming a second semiconductor layer adjacent to the second gate line, forming an upper electrode covering the second semiconductor layer and at least partially overlapping the second gate line, forming a passivation layer above the drain electrode and the upper electrode, forming contact holes in the passivation layer above the drain electrode and the second semiconductor layer and forming a pixel electrode on the passivation layer that is connected to the drain electrode and the upper electrode through the contact holes.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Figure 1:
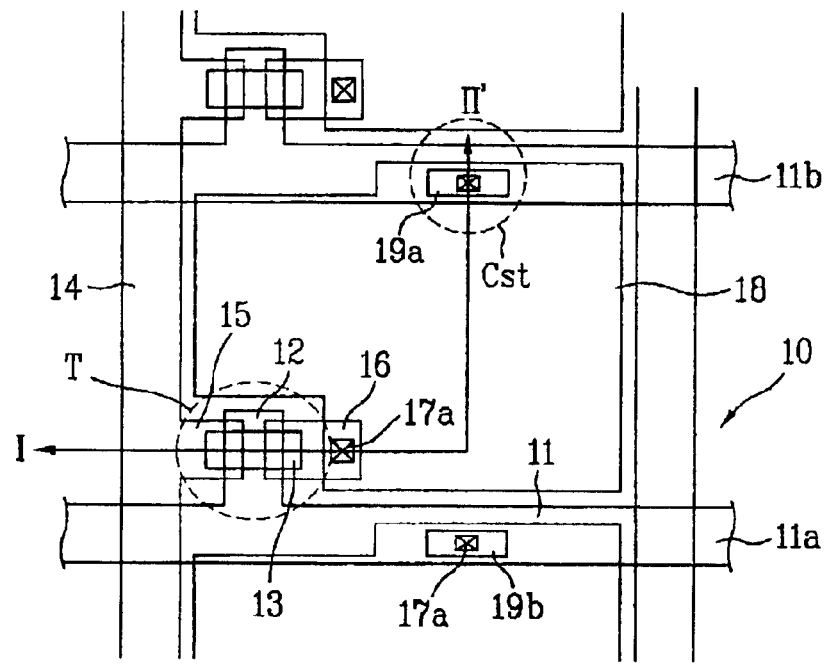
FIG. 1 illustrates a layout of a liquid crystal display according to the related art.
Figure 2:
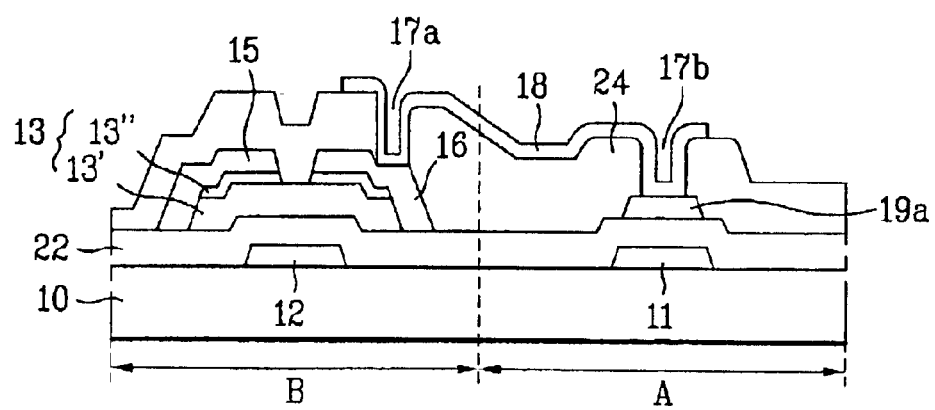
FIG. 2 illustrates a cross-sectional view of a liquid crystal display along the line II–II' shown in FIG. 1.
Figure 3:
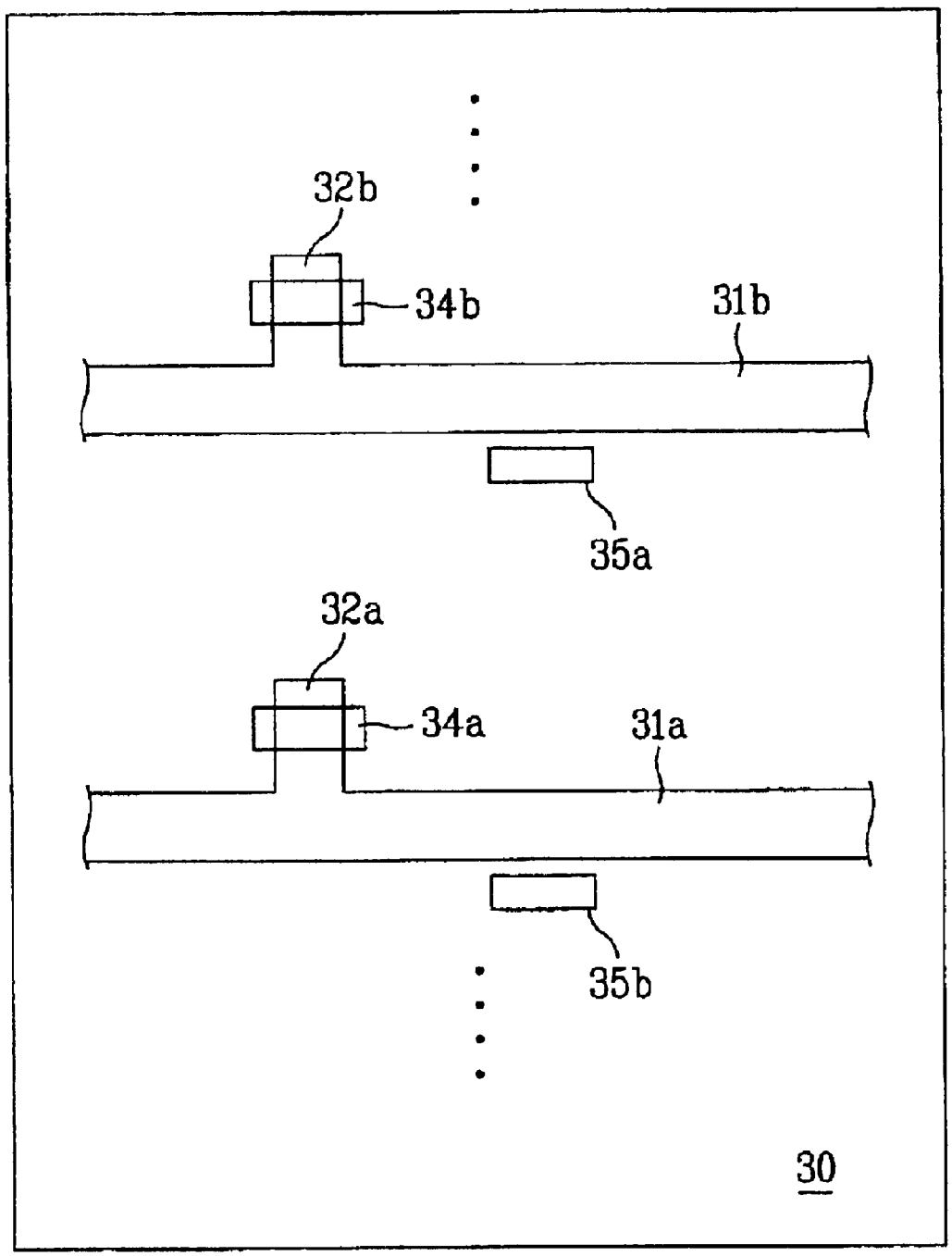
FIG. 3 and FIG. 4 illustrate layouts for explaining a method of manufacturing a liquid crystal display device according to an embodiment of the present invention.
Figure 4:
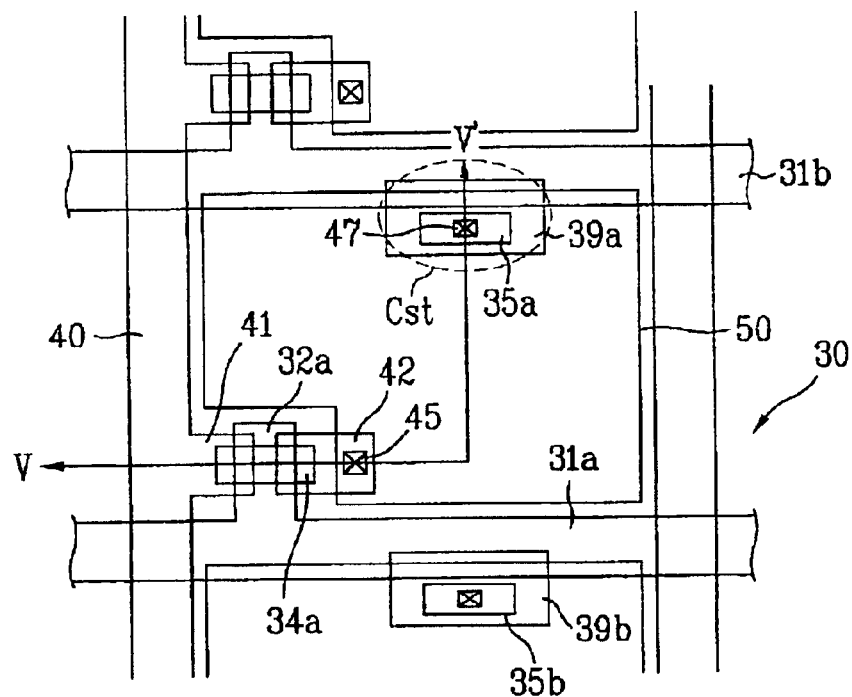

Reference will now be made in detail to the preferred embodiments of the present invention, examples of which are illustrated in the accompanying drawings. Wherever possible, the same reference numbers will be used throughout the drawings to refer to the same or like parts. FIG. 3 and FIG. 4 illustrate layouts for explaining a method of manufacturing a liquid crystal display device according to an embodiment of the present invention, and FIG. 5 illustrates a cross-sectional view of a liquid crystal display along the line V–V' shown in FIG. 4.

A liquid crystal display device according to the present invention will be explained with reference to the accompanying drawings. Referring to FIG. 3, a transparent glass is prepared as an array substrate 30 for a liquid crystal display. Gate lines 31 are formed on the substrate 30 in one direction, and simultaneously, a gate electrode 32 is formed to protrude from one side of the gate lines 31. A gate insulating layer (not shown in the drawing) is formed on an entire surface of the substrate 30 having the gate lines 31 and gate electrodes 32 formed thereon. Subsequently, a first semiconductor layer 34a is formed on the gate insulating layer (not shown) over the gate electrode 32a of a gate line 31a to define an active layer for a thin film transistor. While the first semiconductor layer 34a is formed, a second semiconductor layer 35a is formed on a predetermined area adjacent to the gate line 31b for other cells. The second semiconductor layer 35a is for preventing failure of a storage-on-gate capacitor that will later be formed.

As shown in FIG. 4, at least one data line 40 is formed adjacent to the first semiconductor layer 34a and an upper electrode 39a is formed on the second semiconductor layer 35a. Simultaneously, when the data line 40 is formed, source and drain electrodes 41 and 42 are formed to respectively overlap separate sides of the gate electrode 32. More particularly, the source electrode 41 protrudes from one side of the data line 40. The drain electrode is formed separate from the source electrode 41 and connects to the pixel electrode 50. The gate electrode 32a, source electrode 41, drain electrode 42, and first semiconductor layer 34a are parts of a thin film transistor.

Figure 5:
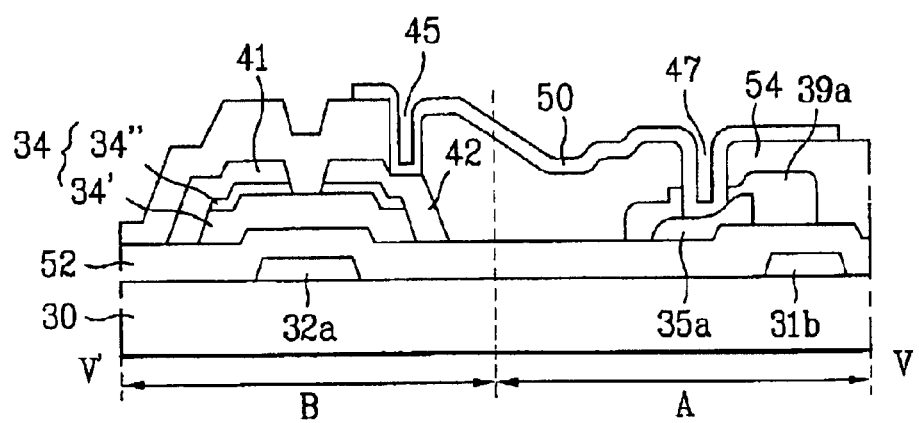
FIG. 5 illustrates a cross-sectional view of a liquid crystal display along the line V–V' shown in FIG. 4.

FIG. 5 is a cross-sectional view along line V–V' in FIG. 4 showing that the thin film transistor includes a first semiconductor layer 34 of amorphous silicon over the gate electrode 32a. A gate insulating layer 52 insulates the first semiconductor layer 34a from the gate electrode 32a. The source electrode 41 and drain electrode 42 respectively overlap separate sides of the gate electrode 32a. A pair of ohmic contact layers 34" respectively connects the source electrode 41 and drain electrode 42 to the active layer 34'.

In forming the storage capacitor Csc of the on-gate-storage to maintain a pixel voltage on the pixel electrode 50, the upper electrode 39a is formed to partially overlap the adjacent gate line 31b when the data line 40 is formed. The upper electrode 39a is formed to cover the second semiconductor layer 35a, and is preferably formed of Mo. Subsequently, a passivation layer 54 is formed on the source electrode 41, drain electrode 42, first semiconductor layer 34a, data line 40 and upper electrode 39a. Predetermined portions of the passivation layer 54 are etched to form a first contact hole 45 and a second contact hole 47 to expose the drain electrode 42 and upper electrode 39a over the second semiconductor layer 35a, respectively. The second semiconductor layer 35a beneath the upper electrode 39a prevents the gate insulating layer 52 on the adjacent gate line 31b from being etched when the second contact hole 47 is formed.

A transparent conductive material, such as indium-tin-oxide, is formed on the passivation layer 54 to form the pixel electrode 50. The pixel electrode 50 overlaps in part with the drain electrode 42 and contacts the drain electrode through the first contact hole 45 such that a signal is applied thereto. Further, the pixel electrode also overlaps in part the upper electrode 39a and contacts the upper electrode 39a and/or the second semiconductor layer 35a. Hence, the upper electrode 39a together with the second semiconductor layer 35a, which are separated from the adjacent gate line 31b by the gate insulating layer 22, construct a storage-on-gate system.

The cross-sectional view shown in FIG. 5 illustrates a storage-on-gate part A and a thin film transistor part B of a cell for explaining an exemplary method for making the present embodiment. Referring to FIGS. 3–5, gate lines 31 are formed on a lower array substrate 30. A first gate line 31a is for switching a data signal to a first cell and a second gate line 31b is for switching data to a second adjacent cell. Each of the gate lines 31 have at least one gate electrode 32, which protrudes form the gate line. A first gate electrode 32a protrudes from the first gate line 31a in the thin film transistor part B. Referring to FIG. 5, a second gate line 31b for switching data to second adjacent cell is formed in the storage-on-gate part A. Gate insulating layer 52 is formed on the gate lines 31 and across the entire surface of the lower array substrate 30 in both the storage-on-gate part A and thin film transistor part B. A first semiconductor layer 34a is formed on the insulating layer 52 over the gate electrode 32a in the thin film transistor part B. A second semiconductor layer 35a is formed in the storage-on-gate part A above the adjacent gate line 31b of a neighboring cell.

The first semiconductor layer 34a includes an active layer 34' formed of amorphous silicon that is used as a channel for the thin film transistor and ohmic contact layers 34" on the active layer 34' used in contacting to source and drain electrodes. The ohmic contact layers 34" can be amorphous silicon that is highly doped with p-type or n-type impurities depending upon the conductivity type of the thin film transistor. The second semiconductor layer 35a is preferably formed of the same type of amorphous silicon with the same conductivity type as used in forming the ohmic contact layers 34" of the first semiconductor layer 34a. In the example shown in FIGS. 3–5, the second semiconductor layer 35a is formed outside the periphery of the adjacent gate line 31b such that the second semiconductor layer 35a does not overlap the adjacent gate line 31b. Both the first semiconductor layer 34a and the second semiconductor layer 35a, for example, can include an amorphous silicon layer and a doped ohmic contact layer stacked on the amorphous silicon layer. Further, both the first semiconductor layer 34a and the second semiconductor layer 35a can be formed at the same time.

Source electrode 41 and drain electrode 42 are formed to respectively overlap one of the ohmic contact layers 34" of the first semiconductor layer 34a. More particularly, the source electrode 41 extends from the data line 40 to overlap one side of the gate electrode 32a and is formed while the data line 40 is formed. The drain electrode 42 is separated from the source electrode 41 and overlaps the other side of the gate electrode 32a. While the source and drain electrodes 41 and 42 are formed, the upper electrode 39a in the stage-on-gate part is formed to overlap the adjacent gate line 31b of a neighboring cell to complete the capacitor Csc of the storage-on-gate system for the cell.

A passivation layer 54 is formed on the upper electrode 39a, source electrode 41, and drain electrode 42 and across the entire surface of the lower array substrate 30 in both the storage-on-gate part A and thin film transistor part B. A first contact hole 45 and a second contact hole 47 are formed on the passivation layer 54 to expose predetermined portions of the drain electrode 42 and upper electrode 39a, respectively. Subsequently, a pixel electrode 50, such as an Indium-Tin-Oxide (ITO) film, is deposited on the passivation layer 54 and into the first and second contact holes 45 and 47 such that an electrical connection is made to both the drain electrode 42 and upper electrode 39a of the Csc capacitor.

Since the storage upper electrode 39a is formed of Mo that does not have etch selectivity with respect to the etchant used for etching the passivation layer 54, the upper electrode 39a may be etched. However, the second semiconductor layer 35a beneath the upper electrode 39a of the present embodiment prevents the gate insulating layer 52 on the adjacent gate line 31b from being etched. This is because the second semiconductor layer 35a is selective to the etchant used in etching the passivation layer 54 in that the etchant will not etch the second semiconductor layer 35a.

A stable connection structure is provided for the upper electrode since a subsequently deposited pixel electrode will either make contact with the upper electrode, both the upper electrode and the second semiconductor layer, or just the second semiconductor layer, which is still connected to the upper electrode if a substantial amount of over-etching occurs through the upper electrode. Further, the second semiconductor layer prevents a short circuit between the pixel electrode and an adjacent gate line. Therefore, the present invention provides a stable upper electrode connection structure and maintains the integrity of the storage capacitor in the storage-on-gate system of an LCD device.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display device comprising:
    a substrate;
    first and second gate lines on the substrate, wherein each gate line has at least one gate electrode;
    a gate insulating layer above the gate lines;
    at least one data line crossing over the gate lines;
    a first semiconductor layer above a gate electrode of the first gate line;
    a source electrode connected to the data line and overlapping a first side of the first semiconductor layer;
    a drain electrode overlapping a second side of the first semiconductor layer;
    a second semiconductor layer above but vertically offset from the second gate line;
    an upper electrode covering the second semiconductor layer and at least partially overlapping the second gate line;
    a passivation layer above the drain electrode and the upper electrode;
    contact holes in the passivation layer directly above the drain electrode and the second semiconductor layer; and
    a pixel electrode on the passivation layer that is connected to the drain electrode and the upper electrode through the contact holes.

2. The device of claim 1, wherein the second semiconductor layer is outside of a periphery of the second gate line.

3. The device of claim 1, wherein the first semiconductor layer and the second semiconductor layer each include an amorphous silicon layer and a doped ohmic contact layer.

4. The device of claim 1, wherein the pixel electrode contacts the second semiconductor layer.

5. The device of claim 1, wherein the pixel electrode contacts both the upper electrode and the second semiconductor layer.

6. The device of claim 1, wherein the data line, the source electrode and the drain electrode are formed of Mo.

7. The device of claim 1, wherein the upper electrode is formed of Mo.

8. A method of manufacturing a liquid crystal display device on a substrate, comprising the steps of:
    forming first and second gate lines on the substrate, wherein each gate line has at least one gate electrode;
    forming at least one data line crossing over the first and second gate lines;
    forming a gate insulating layer above the gate lines;
    forming a first semiconductor layer above a gate electrode of the first gate line;
    forming a source electrode connected to the data line and overlapping a first side of the first semiconductor layer;
    forming a drain electrode overlapping a second side of the first semiconductor layer;
    forming a second semiconductor layer above but vertically offset from the second gate line;
    forming an upper electrode covering the second semiconductor layer and at least partially overlapping the second gate line;
    forming a passivation layer above the drain electrode and the upper electrode;
    forming contact holes in the passivation layer directly above the drain electrode and the second semiconductor layer; and
    forming a pixel electrode on the passivation layer to be connected to the drain electrode and the upper electrode through the contact holes.

9. The method of claim 8, wherein the first semiconductor layer and the second semiconductor layer each include an amorphous silicon layer and a doped ohmic contact layer.

10. The method of claim 8, wherein the second semiconductor layer is formed outside of a periphery of the second gate line.

11. The method of claim 8, wherein the data line, the source electrode, and the drain electrode are formed of Mo.

12. The method of claim 8, wherein the upper electrode is formed of Mo.

13. The method of claim 8, wherein the upper electrode is simultaneously formed with the data line, and the source and drain electrodes.

14. The method of claim 8, wherein the step of forming contact holes in the passivation layer above the drain electrode and the second semiconductor layer includes etching with an etchant that is selective for the second semiconductor layer.

15. The method of claim 8, wherein the step of forming a pixel electrode on the passivation layer includes depositing an Indium-Tin-Oxide onto the passivation layer and into contact holes.

* * * * *